No. 770,531.

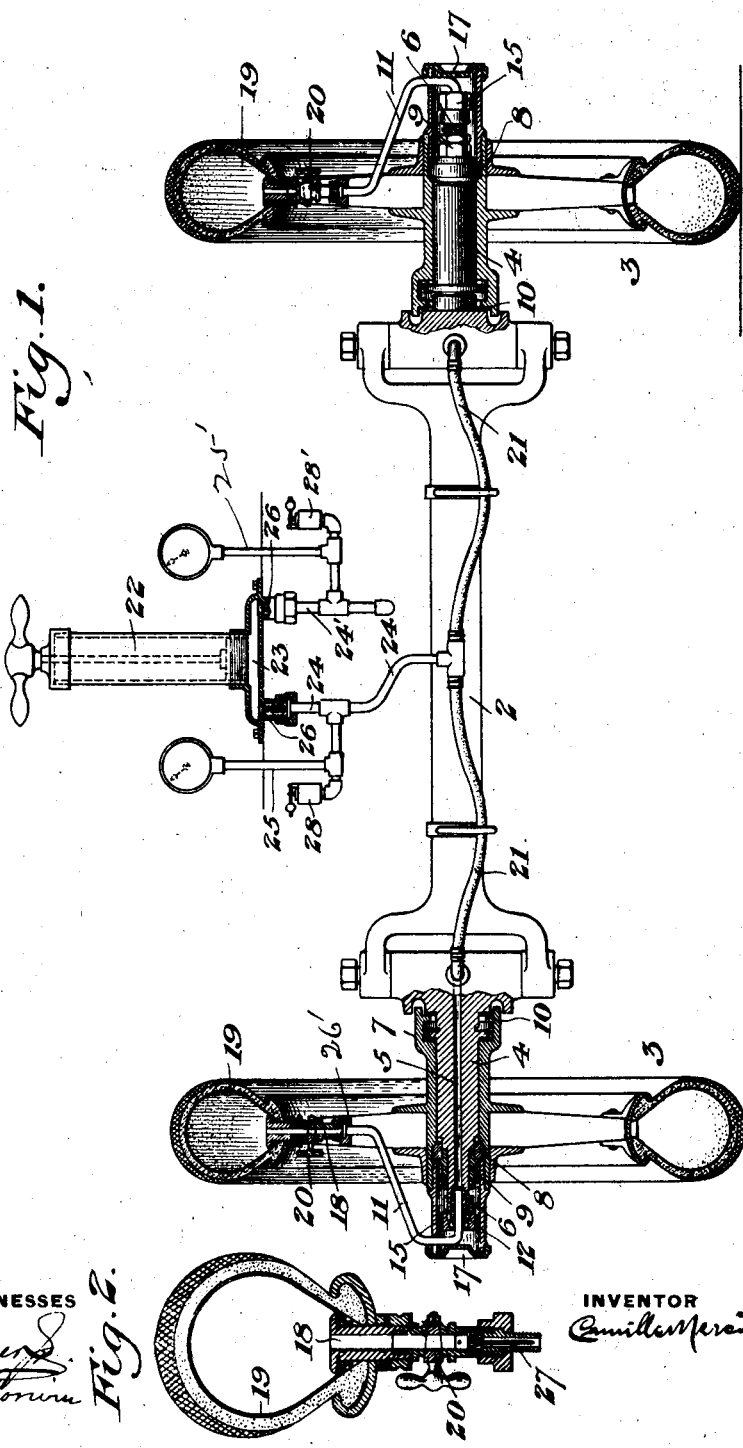

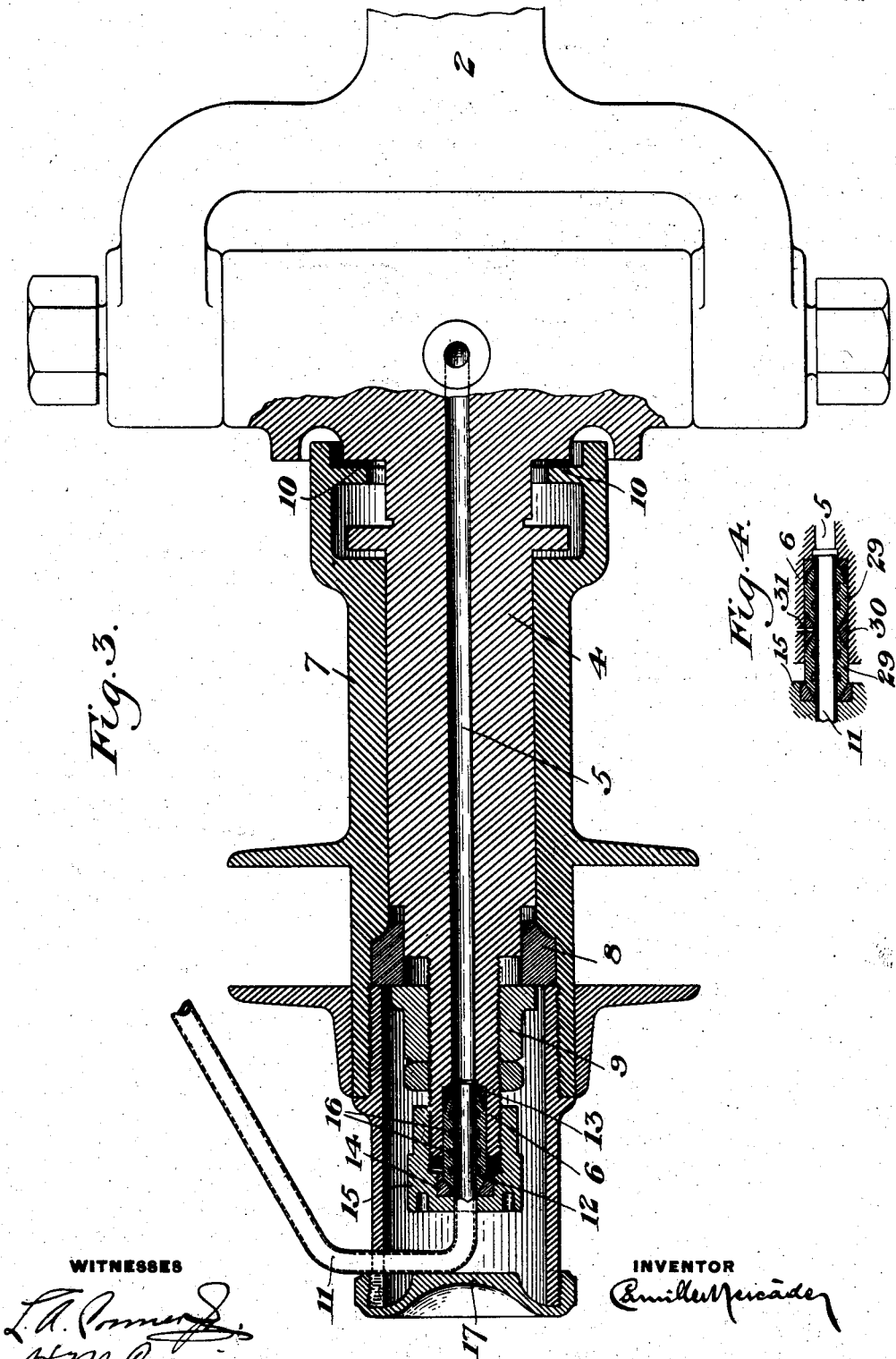

Patented September 20, 1904.

UNITED STATES PATENT OFFICE.

CAMILLE MERCÀDER, OF PITTSBURG, PENNSYLVANIA.

PNEUMATIC-TIRED VEHICLE.

SPECIFICATION forming part of Letters Patent No. 770,531, dated September 20, 1904.

Application filed November 13, 1903. Serial No. 181,069. (No model.)

*To all whom it may concern:*

Be it known that I, CAMILLE MERCÀDER, of Pittsburg, Allegheny county, Pennsylvania, have invented a new and useful Pneumatic-Tired Vehicle, of which the following is a full, clear, and exact description, reference being had to the accompanying drawings, forming part of this specification, in which—

Figure 1 is a sectional front elevation showing the two front wheels of an automobile provided with my invention. Fig. 2 is an enlarged cross-section of the rim and tire, showing the check-valve attachment. Fig. 3 is an enlarged longitudinal section through the axle, and Fig. 4 is a detail view showing modified form of packing.

My invention relates to a class of pneumatic-tired vehicles, and more especially to automobiles, that have to be driven at a high rate of speed. In vehicles of this class serious and fatal accidents have often occurred due to the sudden collapse of one of the pneumatic tires. The tire being several inches in diameter, when it collapses during traveling at high speed it causes a sudden swerve of the vehicle, resulting in serious accidents.

My invention is designed to overcome this difficulty and provide for deflating of a pair of tires whenever one of them collapses.

It is further designed to provide for inflating of the tires during running and for isolating any tire from the connecting system which forms a part of the invention.

In the drawings, 2 represents the axle proper, having the wheels 3 3 mounted upon pivot-axles 4, connected to the main axle through the vertical pivots shown. Each pivot-axle is provided with a central hole 5, which extends through the main body of the pivot-axle and through the screw-threaded portion 6 at its outer end. The hollow journal or hub 7 of the wheel rotates about the pivot-axle and is held by collar 8 and lock-nut 9 on the threaded part of the pivot-axle, the collar 8 being forced against a bearing-ring 10. A hollow pipe 11 projects axially into the outer end of the pivot-axle and is provided at its inner end with a packing device 12 within the end portion of the threaded extension. This packing device preferably consists of a sleeve having conical ends, which are arranged to be forced against rings 13 and 14, the ring 14 being within the screw-cap 15, which screws on the threaded extension, while the ring 13 is within the extension at the other end of the packing-collar. The packing-sleeve is preferably provided with internal annular grooves 16 shown, which may contain fibrous packing and provided with a lubricant. The hollow pipe 11 extends axially outwardly and butts against the hub-cap 17. It is extended thence laterally through the hub and connected to the inlet-tube 18, leading to the interior of the pneumatic tire 19. The inlet-tube is preferably provided with a hand-controlled stop-cock 20, by which connection between the tire and the feed-pipe can be cut off. The hole through the pivot-axle connects at its inner end with a flexible tube 21, connecting the two pivot-axles.

With the construction above described when the vehicle is in motion the pipes will rotate with the wheels and their inner ends will turn within the packing-sleeves of the pivot-axles. Assuming that the stop-cocks are open, in case of puncture, bursting, or other sudden deflating of one wheel its companion wheel at the other end of the axle will be deflated at the same time by reason of the connection between their inlet-tubes. It is therefore evident that as one wheel decreases in diameter under the deflating the other wheel will deflate, thus preventing a tendency to swerve to one side.

To provide for a slight leakage in either tire or in the connections, I preferably provide an air-pump 22 on the vehicle, which I have shown as a hand-pump, though it may be driven from the driving-gear of the vehicle through a hand-controlled clutch. If desired, air may be supplied from a cylinder which is charged with liquid air instead of employing a hand-pump for the purpose of inflating the tires, the cylinder in this case being supplied with a suitable regulating-valve. I have shown this hand-pump as provided with a small reservoir 23, from which a pipe 24 leads to the flexible pipe. From the pipe 24 a branch pipe 25 leads upwardly to a pressure-gage which is within the sight of the operator. A springpressed upwardly-seating valve 26 controls the flow of air from the air-pump to the pipe 24, thus preventing the back pressure from escaping into the pump. A similar pipe 24' and gage-pipe 25' are provided for the rear axle and rear wheels if the system is to be used on all four wheels of the vehicle. With this system the operator can see at a glance the pressure existing in the tires, and in case of a decrease in the pressure of either set he can actuate the pump and raise the pressure to the desired amount. If the pressure be increased, due to the expansion of the air from heating while the vehicle is rapidly running, the pressure may be automatically relieved by valves 28 28'. The relief-valves being set at the desired point, the gages will show the normal pressure to the operator and also any excess pressure up to the point at which the relief-valves act.

In case the pipe connection from any tire becomes so leaky that the operator finds it difficult to keep up the pressure he can turn the stop-cock in the supply-tube leading to this tire, and thus isolate it and cut off its connection, so that its pressure will be held. If the connections for supplying air to the tire become injured through accidents or otherwise, the operator can unscrew the screw-plug 26' at the end of the inlet-tube on this wheel and insert the valve-tube 27, as shown in Fig. 2. The screw-plug being then replaced, the operator can apply the ordinary pump and pump up this tire, the supplemental valve thus provided preventing escape of the pressure. Instead of a single packing-sleeve around the inner end of the axial pipe I may use two of these sleeves, as shown at 29 of Fig. 4. In this case a conical ring 30 is provided between the adjacent ends of the two sleeves, and an oil-channel 31 may lead in through this ring.

The advantages of my invention will be apparent to those skilled in this art. The serious accidents resulting from deflating of one tire while running at high speed and consequent swerving of the vehicle are prevented, since both tires of a pair are deflated simultaneously in such case. By providing the pipes with the automatic relief-valves bursting of one or both tires due to excessive pressure is prevented. The pressure in the tires both normal, and abnormal may be seen by the operator and the relief-valves prevent the pressure from reaching the danger limit, where the pressure is likely to burst the tires, and the gages serve to show when any decrease in pressure has taken place and enable the operator to keep them at any desired pressure, such as he found by experiment to give the most efficient results. The tire can be isolated in case of leakage or for any other reason and can be separately pumped up independent of the system.

The packing device for the axial supply-pipes may be varied, as may also the character of the axles, the tires, &c., without departing from my invention.

I claim—

1. A vehicle having supporting-wheels with pneumatic tires, a pipe connecting with the tire and leading axially into the non-rotating axle and a connection between the hollow axle and the pump on the vehicle; substantially as described.

2. A pneumatic-tired vehicle having a pair of wheels with pipes connected to their tires and connected axially with the non-rotating axle end and a pressure-channel connecting the two axial pipes; substantially as described.

3. A pneumatic-tired vehicle having a flexible pipe extending along the axle, and pneumatically connected with non-rotating axial pipes at the ends of said axle, said pipes being connected to the two tires; substantially as described.

4. A pneumatic-tired vehicle having a flexible pipe extending along the axle, and pneumatically connected with non-rotating axial pipes at the ends of said axle, said pipes being connected to two tires, and an air-supply connected to the intermediate pipe; substantially as described.

5. A pneumatic-tired vehicle having a flexible pipe extending along one axle and pneumatically connected with axial pipes connected to the two tires and a cut-off valve for each tire; substantially as described.

6. A vehicle having a pair of pneumatic-tired wheels on the same axle, a pipe on each wheel connected at one end to the tire and having at its other end a rotatable central connection with the axle, and a connection between the two pipes; substantially as described.

7. A vehicle having a pair of pneumatic-tired wheels on pivoted ends of the same main axle, an axial pipe on each wheel connected to the tire and having a rotatable central connection with its corresponding pivot-axle, a connection between the two pipes, and an air-supply on the vehicle with an outlet leading to the connection; substantially as described.

8. A vehicle having a pair of pneumatic-tired wheels on the same axle, an axial pipe on each wheel connected to the tire and having a rotatable central connection with the axle, a connection between the two pipes, an air-supply on the vehicle with a valved outlet leading to the connection and a gage connected to the pipe-outlet.

9. A wheel having a pneumatic tire and a detachable connection between said tire, and a pipe, said pipe having rotatable axial connection with the axle of the vehicle, and a pneumatic-tired vehicle having a supply-tube connected to the inlet-tube of the tire and provided with a bent extension leading axially into the end of the hollow axle and provided with a packing device therein; substantially as described.

10. A pneumatically-tired vehicle having a relief-valve, a pressure-gage, and a connection between the tires and the relief-valve and pressure-gage; substantially as described.

11. A pneumatic-tired vehicle having pneumatically-communicating non-rotating axle ends with axial rotatable pneumatic connections leading to the wheel-tires, whereby deflation of one tire will simultaneously deflate the other; substantially as described.

12. A pneumatic-tired vehicle having an axle provided with independently-rotatable wheels, and axial pneumatic connections between the axle and the tires of the two wheels thereof; substantially as described.

13. A pneumatic-tired vehicle having a main axle, pivot-axles and independently-rotatable wheels, and axial pneumatic connections between the tires of the two wheels; substantially as described.

In testimony whereof I have hereunto set my hand.

CAMILLE MERCÀDER.

Witnesses:
 GEO. B. BLEMING,
 JOHN MILLER.